(12) United States Patent  
Sasaoka et al.

(10) Patent No.: US 7,997,792 B2  
(45) Date of Patent: Aug. 16, 2011

(54) OPTICAL FIBER TEMPERATURE SENSOR

(75) Inventors: Eisuke Sasaoka, Yokohama (JP);  
Yoshinori Yamamoto, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 365 days.

(21) Appl. No.: 12/438,637

(22) PCT Filed: Aug. 21, 2007

(86) PCT No.: PCT/JP2007/066178  
§ 371 (c)(1),  
(2), (4) Date: Mar. 19, 2009

(87) PCT Pub. No.: WO2008/023695  
PCT Pub. Date: Feb. 28, 2008

(65) Prior Publication Data  
US 2010/0054298 A1   Mar. 4, 2010

(30) Foreign Application Priority Data  
Aug. 24, 2006   (JP) ............................... P2006-227989

(51) Int. Cl.  
*G01J 5/00* (2006.01)  
*G01K 11/12* (2006.01)  
*G01D 5/26* (2006.01)

(52) U.S. Cl. .................. 374/130; 374/131; 356/73.1

(58) Field of Classification Search .............. 374/1, 130, 374/131, 133, 137, 161, E11.015, E11.016, 374/E11.017; 356/73.1; 382/12  
See application file for complete search history.

(56) References Cited

U.S. PATENT DOCUMENTS

| | | | |
|---|---|---|---|
| 7,170,590 B2* | 1/2007 | Kishida | 356/32 |
| 7,227,123 B2* | 6/2007 | Kwon et al. | 250/227.14 |
| 7,719,666 B2* | 5/2010 | Kishida et al. | 356/73.1 |
| 2010/0027581 A1* | 2/2010 | Sasaoka | 374/137 |

(Continued)

FOREIGN PATENT DOCUMENTS

JP   2-103428 A   4/1990

(Continued)

OTHER PUBLICATIONS

K. Hotate et al. "Simplified System of Fiber Brillouin Optical Correlation Domain Analysis for Distributed Strain Sensing", International congress on 16th optical fiber sensors (OFS-16), We2-3, p. 290-293, Oct. 2003.

*Primary Examiner* — Amy Cohen Johnson  
(74) *Attorney, Agent, or Firm* — Venable LLP; Michael A. Sartori (57) ABSTRACT

The present invention relates to an optical fiber temperature sensor capable of reducing an error in a temperature measurement. The sensor comprises an optical fiber, an optical frequency difference adjusting section, a light source system, a spectrum measuring section, a temperature calculating section, and a correcting section. The light source system outputs, into different ends of the optical fiber, probe light and pumping light of which each center frequency is set corresponding to an instruction from the optical frequency difference indicating section respectively. The temperature calculating section calculates a temperature of an object based on BGS in a first domain measured by the spectrum measuring section. On the other hand, the correcting section outputs a correction instruction to the light source system so that BGS center frequency of a second domain may be in agreement with a reference value thereof.

4 Claims, 4 Drawing Sheets

U.S. PATENT DOCUMENTS

| | | | |
|---|---|---|---|
| 2010/0040108 A1* | 2/2010 | Sasaoka et al. | 374/120 |
| 2010/0092127 A1* | 4/2010 | Sasaoka et al. | 385/12 |
| 2010/0238427 A1* | 9/2010 | Sasaoka et al. | 356/73.1 |

FOREIGN PATENT DOCUMENTS

| | | |
|---|---|---|
| JP | 2-201233 A | 8/1990 |
| JP | 2000-180265 A | 6/2000 |
| JP | 2003-14584 A | 1/2003 |
| JP | 2003-322588 A | 11/2003 |
| JP | 2004-101472 A | 4/2004 |

* cited by examiner

OPTICAL FIBER TEMPERATURE SENSOR

TECHNICAL FIELD

The present invention relates to an optical fiber temperature sensor for performing temperature measurement of the optical fiber using a gain by Brillouin scattering generated in the optical fiber.

BACKGROUND ART

A shape of the Brillouin gain spectrum (which will be referred to hereinafter as a "BGS") which is a spectrum of a gain by the Brillouin scattering generated in an optical fiber changes with temperature and distortion of the optical fiber. A technology which measures the temperature and distortion using the change of shape of BGS is known.

As the technology which measures BGS, BOCDA (Brillouin Optical Correlation Domain Analysis) is known for example, (see Non-Patent Document 1). In the BOCDA, pumping light and probe light are made to be inputted opposing each other into both ends of the optical fiber, and at the same time, sweeping a difference (which will be referred to hereinafter as an "optical frequency difference") of each center frequency of the probe light and the pumping light, BGS of the gain generated at the position where the phase coincides with each other is measured.

Non-Patent Document 1: Kazuo HOTATE, et al., "Simplified System of Fiber Brillouin Optical Correlation Domain Analysis for Distributed Strain Sensing", International congress on 16th optical fiber sensors (OFS-16), We2-3, p. 290-293, October 2003.

DISCLOSURE OF THE INVENTION

Problems that the Invention is to Solve

The present inventors have examined the above prior art, and as a result, have discovered the following problems. That is, the probe light and the pumping light are optical-frequency-modulated as follows in BOCDA which is described in the above-mentioned Non-Patent Document 1.

First, an injection current modulated with a certain frequency and amplitude corresponding to an indication value is outputted from a waveform generator. When the injection current outputted from the waveform generator is inputted into DFB-LD, the probe light and the pumping light which are optical-frequency-modulated respectively are outputted from the DFB-LD. Thus, BGS is expressed as a function of the optical frequency difference between the probe light and the pumping light which are optical-frequency-modulated.

However, the injection current outputted from the waveform generator corresponding to the indication value and the optical frequency response characteristic of DFB-LD corresponding to the injection current changes over time. Therefore, the actual value of the optical frequency difference between the pumping light and the probe light will change over time against the indication value. When the actual value of the optical frequency difference between the pumping light and the probe light will deviate from the indication value, the actual BGS will deviate against a horizontal axis (indication value of optical frequency difference). Thereby, an error is generated in a temperature measurement based on the shape of BGS.

The present invention has been developed to eliminate the problems described above. It is an object of the present invention to provide an optical fiber temperature sensor having a configuration capable of reducing the measurement error resulting from the characteristic change over time of component parts.

Means for Solving the Problems

The optical fiber temperature sensor according to the present invention comprises an optical fiber, an optical frequency difference adjusting section, a light source system, a spectrum measuring section, a temperature calculating section, and a correcting section. The optical fiber includes a first domain installed in an object and a second domain set as a specified temperature. The optical frequency difference adjusting section sweeps a difference between each center frequency of probe light and pumping light to be inputted into the optical fiber. The light source system outputs the probe light of which the center frequency is set by an instruction of the optical frequency difference adjusting section into one end of the optical fiber, while outputting pumping light of which the center frequency is set by the instruction of the optical frequency difference adjusting section into the other end of the optical fiber. The spectrum measuring section receives the probe light having acquired a gain by Brillouin scattering generated with propagation of the probe light and the pumping light from the light source system as an outputted light from the optical fiber, and measures data relevant to a shape of BGS which is a spectrum of the gain acquired by the received probe light with the Brillouin scattering. The temperature calculating section computes a temperature distribution of the first domain in the optical fiber based on a measurement data relevant to the shape of BGS of the first domain measured by the spectrum measuring section. And, the correcting section instructs correction of at least one of optical frequencies of the pumping light and the probe light outputted to the optical fiber to the light source system so as to make known reference data relevant to the shape of BGS set up in advance as reference values of BGS of the second domain at the specified temperature be in agreement with the measurement data relevant to the shape of BGS of the second domain.

In the optical fiber temperature sensor provided with the configuration mentioned above, the instruction for sweeping optical frequency difference are outputted to the light source system from the optical frequency difference adjusting section, and the probe light and pumping light of which the center frequency has been set by the instruction are outputted from the light source system. The probe light and the pumping light outputted from the light source system are inputted opposing each other into the optical fiber. That is, while the probe light is inputted into the optical fiber from one end of the optical fiber, the pumping light is inputted into the optical fiber from the other end of the optical fiber. At this time, the data relevant to the shape of BGS (BGS of the gain generated in the second domain) of the second domain set as the specified temperature of the optical fiber are measured by spectrum measuring section. The correcting section instructs correction of at least one of optical frequencies of the pumping light and the probe light to the light source system so that the measurement data and the reference data set in advance may be in agreement. The spectrum measuring section has measured, in parallel to the correction instruction by the correcting section, the data relevant to the shape of BGS of the first domain installed in the object and the correction instruction is reflected in the data relevant to the shape of the obtained BGS. Therefore, as for the temperature distribution of the first domain which the temperature calculating section computes based on the measurement data, an error of the temperature measurement has been reduced.

The optical fiber temperature sensor according to the present invention may comprise an optical fiber, a light source system, a spectrum measuring section, a correcting section, and a temperature calculating section. In the configuration, the optical fiber includes a first domain installed in an object and a second domain set as a specified temperature. The light source system outputs probe light to one end of the optical fiber while outputting pumping light to the other end of the optical fiber. The spectrum measuring section receives the probe light having acquired a gain by Brillouin scattering generated with propagation of the probe light and the pumping light from the light source system as an outputted light from the optical fiber, and measures data relevant to a shape of BGS which is a spectrum of the gain acquired by the received probe light with the Brillouin scattering. The correcting section outputs an optimum value as a correction value among values set up in advance as a reduced value of an amount of a temperature correction corresponding to a difference between a reference data and a measurement data, based on the difference between known reference data relevant to the shape of BGS set up in advance as reference values of BGS of the second domain at the specified temperature and a measurement data relevant to the shape of BGS of the second domain. The temperature calculating section computes the corrected temperature distribution in the first domain in the optical fiber based on the measurement data relevant to the shape of BGS of the first domain measured by the spectrum measuring section and the correction value outputted from the correcting section.

In the optical fiber temperature sensor provided with such a configuration, the probe light and the pumping light is made to be inputted opposing each other from the light source system into the optical fiber. The data relevant to the shape of BGS (BGS of the gain generated in the second domain) of the second domain set as the specified temperature of the optical fiber is measured by the spectrum measuring section, and the correcting section outputs the reduced value for the temperature correction corresponding to the difference of the measurement data and the reference data. The spectrum measuring section has measured the data relevant to the shape of BGS of the first domain installed in the object in parallel to the determination process of the reduced value by the correcting section, and the temperature calculating section computes the temperature distribution of the first domain based on the measurement data and the reduced value outputted from the correcting section, and thereby, an error of the temperature measurement is reduced.

Also, the optical fiber temperature sensor according to the present invention may comprise an optical fiber, an optical frequency difference adjusting section, a light source system, a spectrum measuring section, a temperature calculating section, a storage part, and a correcting section. In the configuration, the optical fiber includes a first domain installed in an object and a second domain set as a specified temperature. The optical frequency difference adjusting section sweeps a difference between each center frequency of probe light and pumping light to be inputted into the optical fiber. The light source system outputs the probe light of which the center frequency is set by an instruction of the optical frequency difference adjusting section into one end of the optical fiber, while outputting pumping light of which the center frequency is set by the instruction of the optical frequency difference adjusting section into the other end of the optical fiber. The spectrum measuring section receives the probe light having acquired a gain by Brillouin scattering generated with propagation of the probe light and the pumping light from the light source system as an outputted light from the optical fiber, and measures data relevant to a shape of BGS which is a spectrum of the gain acquired by the received probe light with the Brillouin scattering. The temperature calculating section computes a temperature distribution in the first domain in the optical fiber based on a measurement data relevant to the shape of BGS of the first domain measured by the spectrum measuring section. The storage part stores known reference data relevant to the shape of BGS set up in advance as reference values of BGS of the second domain with respect to various temperatures. And the correcting section instructs correction of at least one of optical frequencies of the pumping light and the probe light outputted to the optical fiber to the light source system so as to make the measurement data relevant to the shape of BGS of the second domain be in agreement with the reference data among the reference data stored in the storage part corresponding to the temperature of the second domain measured by the temperature measuring means.

In the optical fiber temperature sensor provided with the configuration mentioned above, an instruction for sweeping optical frequency difference is outputted to the light source system from the optical frequency difference adjusting section. The light source system makes the probe light and the pumping light of which the center frequency is set by the instruction thereof be inputted opposing each other into the optical fiber. The spectrum measuring section has measured the data relevant to the shape of BGS (BGS of the gain generated in the second domain) of the second domain in which the temperature measurement is possible, and the correcting section instructs correction of at least one of optical frequencies of the pumping light and the probe light to the light source system so that the measurement data and the reference data of BGS of the second domain stored corresponding to various temperatures may be in agreement. At this time, the spectrum measuring section has also measured the data relevant to the shape of BGS of the first domain installed in the object, and the correction instruction is reflected to the data relevant to the shape of the obtained BGS. Therefore, as for the temperature distribution of the first domain which the temperature calculating section computes based on the measurement data, an error of the temperature measurement has been reduced.

Further, the optical fiber temperature sensor according to the present invention may comprise an optical fiber, a light source system, a spectrum measuring section, a storage part, a correcting section, and a temperature calculating section. In the configuration, the optical fiber includes a first domain installed in an object and a second domain set as a specified temperature. The light source system outputs probe light to one end of the optical fiber while outputting pumping light to the other end of the optical fiber. The spectrum measuring section receives the probe light having acquired a gain by Brillouin scattering generated with propagation of the probe light and the pumping light from the light source system as an outputted light from the optical fiber, and measures data relevant to a shape of BGS which is a spectrum of the gain acquired by the received probe light with the Brillouin scattering. The storage part stores known reference data relevant to the shape of BGS set up in advance as reference values of BGS of the second domain with respect to various temperatures. The correcting section outputs an optimum value as a correction value among values set up in advance as a reduced value of an amount of a temperature correction corresponding to a difference between a reference data and a measurement data, based on the difference between the reference data corresponding to the temperature of the second domain measured by the specified temperature measuring means among the reference data stored in the storage part and a measurement data relevant to the shape of BGS of the second domain. And the temperature calculating section computes a corrected temperature distribution in the first domain in the optical fiber based on the measurement data relevant to the shape of BGS of the first domain measured by the spectrum measuring section and the correction value outputted from the correcting section.

In the optical fiber temperature sensor provided with the configuration mentioned above, the probe light and the pumping light is made to be inputted opposing each other from the light source system into the optical fiber. The spectrum measuring section has measured the data relevant to the shape of BGS (BGS of the gain generated in the second domain) of the second domain in which the temperature measurement is possible, and the correcting section outputs the reduced value of the amount of the temperature correction corresponding to the difference of the measurement data and the reference data (reference data stored in the storage part in advance) corresponding to the temperature of the second domain. Based on the measurement data relevant to the shape of BGS of the first domain installed in the object (data measured by the spectrum measuring section) and the reduced value outputted from the correcting section, the temperature calculating section has computed the corrected temperature distribution of the first domain in the optical fiber, and by this configuration, an error of the temperature measurement has been reduced.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

Effects of the Invention

In accordance with the optical fiber temperature sensor according to the present invention, the measurement error resulting from characteristic changes over time of component parts, such as a characteristic change in the light source system generated at the time of the temperature measurement, can be reduced.

DESCRIPTION OF THE REFERENCE NUMERALS 1 to 4 . . . optical fiber temperature sensor; 11 . . . first optical fiber; 12 . . . second optical fiber; 13 . . . optical frequency difference indicating section; 14 . . . light source system; 15 . . . spectrum measuring section; 16, 26 . . . temperature calculating section; 17, 27, 37, 47 . . . correcting section; 18 . . . connecting domain; 21 . . . optical frequency difference adjusting section; 39 . . . thermometer; and DB . . . storage section.

BEST MODES FOR CARRYING OUT THE INVENTION

In the following, embodiments of optical fiber temperature sensors according to the present invention will be explained in detail with reference to FIGS. 1 to 6. In the description of the drawings, identical or corresponding components are designated by the same reference numerals, and overlapping description is omitted.

First Embodiment

Figure 1:
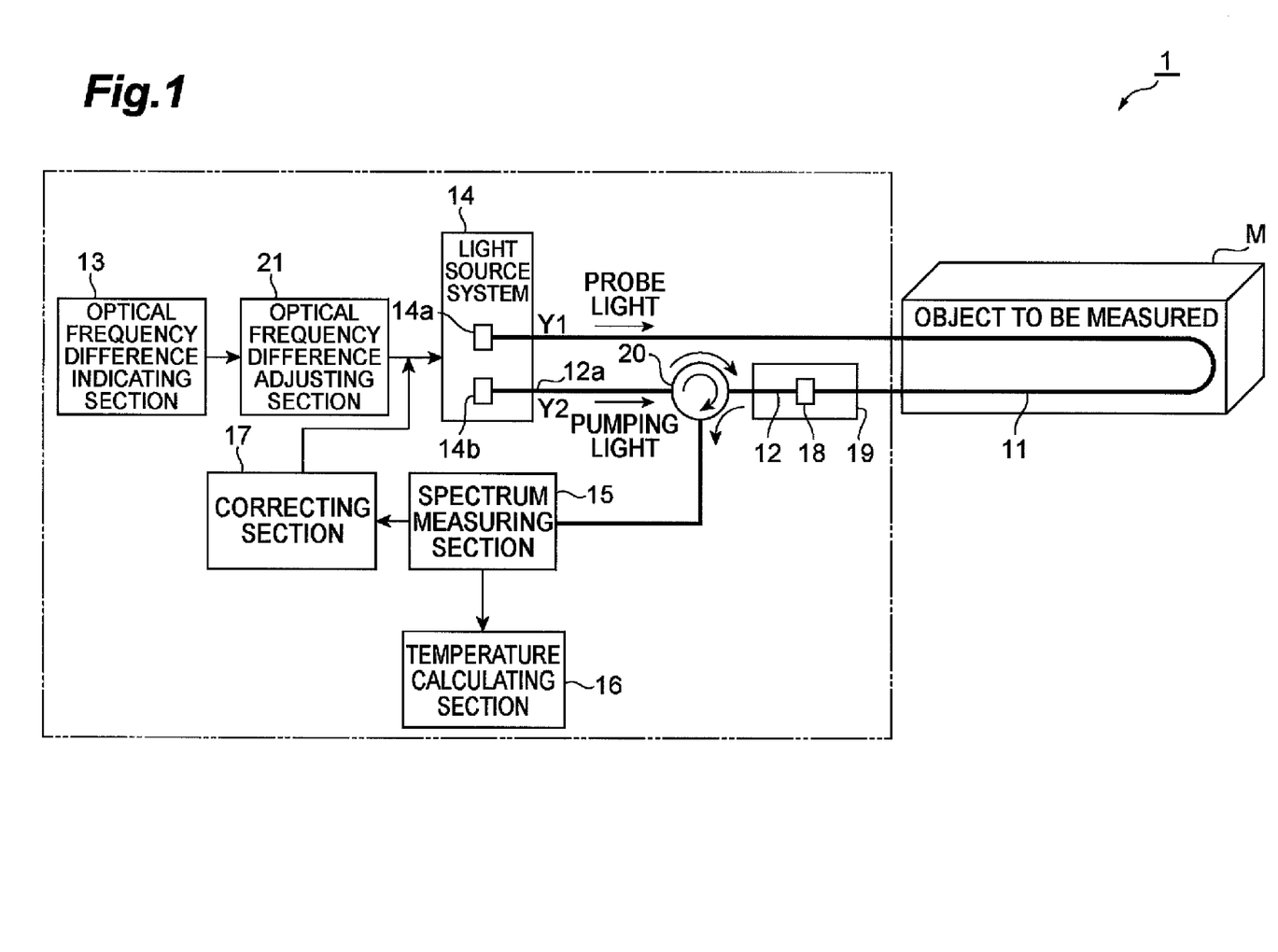
FIG. 1 shows a configuration of a first embodiment of an optical fiber temperature sensor according to the present invention.

FIG. 1 shows a configuration of a first embodiment of the optical fiber temperature sensor according to the present invention. The optical fiber temperature sensor according to the first embodiment is a device which comprises a first optical fiber 11, a second optical fiber 12, an optical frequency difference indicating section 13, a light source system 14, a spectrum measuring section 15, a temperature calculating section 16, a correcting section 17 and an optical frequency difference adjusting section 21, and measures a temperature of object to be measured M. The light source system 14 is able to generate probe light and pumping light by using one light source as disclosed in the above-mentioned Non-Patent Document 1. However, in each following embodiment, as for a configuration of the light source system 14, the configuration including a light source 14a outputting the probe light, and a light source 14b outputting the pumping light is shown.

The first optical fiber 11 and the second optical fiber 12 have a mutually different zero dispersion wavelength. In the first embodiment, the zero dispersion wavelength of the first optical fiber 11 is 1310 nm, and the zero dispersion wavelength of the second optical fiber 12 is 1550 nm. One end of the first optical fiber 11 and one end of the second optical fiber 12 is connected mutually by fusion splicing to each other, and then the first optical fiber 11 and the second optical fiber 12 function as a line of optical fiber. The other end of the first optical fiber 11 is optically connected to the light source 14a, and the other end of the second optical fiber 12 is optically connected to the light source 14b via a fiber 12a for connection thereof. Besides, the light source system 14 may comprise a configuration in which, from one light source, the probe light is supplied to the other end of the first optical fiber 11, and at the same time the pumping light is supplied to the other end of the second optical fiber 12 via the optical fiber 12a for connection thereof, as shown in the above-mentioned Non-Patent Document 1.

A portion (a first domain) of the first optical fiber 11 is installed on the object to be measured M, and then the first optical fiber 11 and the object to be measured M become to have the same temperature mutually. And the first optical fiber 11 may be immersed in the object to be measured M or may be embedded therein.

The vicinity (which will be referred to hereinafter as a "connecting domain 18") of a connecting domain including the connecting domain of the first and second optical fibers 11 and 12 is disposed in a box 19. The inside of the box 19 is set as a specified temperature, and is insulated from the outside. Therefore, the connecting domain (a second domain) 18 is set as the specified temperature. In the first embodiment, the connecting domain 18 is set as 20° C.

The optical frequency difference indicating section 13 outputs an indication value for indicating an optical frequency difference, in order to sweep the difference (optical frequency difference) between center frequencies of the probe light and the pumping light respectively. In the embodiment, the optical frequency difference indicating section 13 outputs the indication value which indicates the optical frequency difference to the optical frequency difference adjusting section 21 such that the optical frequency difference may be swept between 10.00 GHz and 11.00 GHz. The optical frequency difference adjusting section 21 controls the optical frequency of the probe light and the pumping light respectively outputted from the light source system 14 in accordance with the indication value. The light source system 14 outputs the probe light and the pumping light each having a center frequency which is set so as to correspond to the indication value outputted from the optical frequency difference indicating section 13.

In the light source system 14, in the case of that the probe light and the pumping light are generated from one light source, the light source system 14 operates as follows. That is, first, according to the optical frequency difference corresponding to the indication value, a waveform generator outputs, by turns (outputs with a specified cycle), an injection current modulated with and a specified frequency and a specified amplitude in order to perform optical frequency modulation of the probe light, and an injection current modulated with a specified frequency and a specified amplitude in order to perform optical frequency modulation of the pumping light. The outputted injection current is inputted into DFB-LD (one light source which outputs the probe light and the pumping light). DFB-LD outputs (outputs with the specified cycle) the probe light and the pumping light for which optical frequency modulation has been performed, respectively, corresponding to the inputted injection current.

The probe light outputted from the light source system 14 is inputted in the first optical fiber 11 from the one end of the first optical fiber 11, and propagates within the first optical fiber 11 in the direction of the arrow Y1 shown in FIG. 1. On the other hand, the pumping light outputted from the light source system 14 is inputted in the second optical fiber 12 from the one end of the second optical fiber 12, and propagates within the second optical fiber 12 in the direction of the arrow Y2 shown in FIG. 1.

When the pumping light propagates within the optical fiber, an acoustic wave is generated by the pumping light in the optical fiber, and scattering light down-converted in the reverse direction against the propagation direction of the pumping light is generated by an interaction of the pumping light and the acoustic wave. This scattering light is Brillouin scattered light. BGS is a gain spectrum which the probe light receives with the Brillouin scattering.

The probe light in the optical fiber mainly acquires the gain at a position where the probe light and the pumping light exhibit a correlation peak. By changing a phase of the probe light and the pumping light, the position which exhibits the correlation peak shifts, and then BGS of the gain generated in each position along the longitudinal direction of the optical fiber can be measured. In the first embodiment, the light source system 14 has set up the phase of the probe light and the pumping light so as to generate the gain at the required position of the first optical fiber 11 and the second optical fiber 12, respectively.

Figure 2:
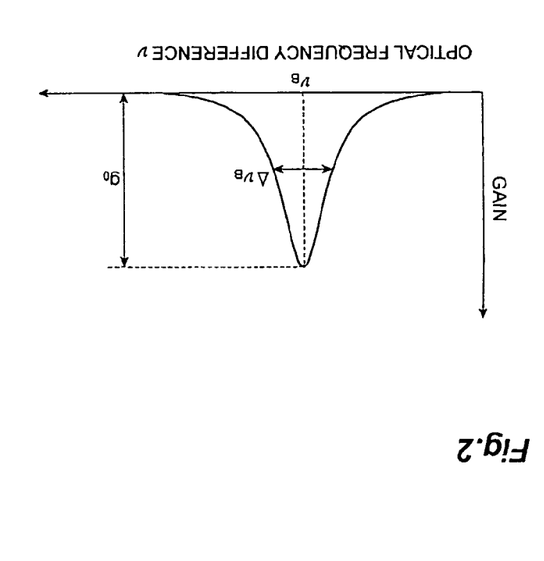
FIG. 2 shows a graph which illustrates BGS.

FIG. 2 is a graph showing BGS. As shown in FIG. 2, BGS is expressed with Lorentz type function of Formula (1), where v denotes an optical frequency difference of the probe light and the pumping light.

$$g_B(v) = \frac{g_0}{1 + \{2(v - v_B)\}/\Delta v_B\}^2} \quad (1)$$

In Formula (1), $g_0$ denotes a maximum gain, $v_B$ denotes a center frequency and $\Delta v_B$ denotes a line width (full width at half maximum). The maximum gain $g_0$, the center frequency $v_B$, and the line width $\Delta v_B$ are parameters by which a shape of BGS is characterized. These parameters change depending on the temperature of the optical fiber.

The spectrum measuring section 15 receives the probe light outputted from the first optical fiber 11 and the second optical fiber 12, and measures data relevant to the shape of BGS. That is, the probe light which propagates within the second optical fiber 12 so as to be opposed to the pumping light, is led to the spectrum measuring section 15 (the probe light is received by the spectrum measuring section 15) by circulator 20 provided in a midway of the second optical fiber 12.

The spectrum measuring section 15 matches a light intensity of the probe light and the indication value outputted from the optical frequency difference indicating section 13, and measures the data relevant to the shape of BGS. As for the spectrum measuring section 15, in the case of that the probe light having acquired the gain with the Brillouin scattering generated in a portion of the first optical fiber 11 belonging to the connecting domain 18 is received, a first measurement value corresponding to the data relevant to the shape of the measured BGS is outputted to the correcting section 17. The data relevant to the shape of BGS means parameters by which the shape of BGS is characterized, other numeric values showing a peak shape (for example, a gradient value of a portion where the gain from the center frequency decreases), and data relevant to a unique shape of the spectrum such as the center frequency difference of the two peaks. This embodiment utilizes the center frequency as the data relevant to the shape of BGS.

In the first embodiment, the connecting domain 18 of the first optical fiber 11 and the second optical fiber 12 in which zero dispersion wavelengths differ mutually is set as the specified temperature. BGS of the Brillouin scattering light outputted from the optical fiber having the different zero dispersion wavelength differs in the shape even when the temperature thereof is identical. Therefore, as each phase of the probe light and the pumping light is made to be changed, the shape of the measured BGS changes when the generation place of the gain moves from one optical fiber to the other optical fiber.

The gain generated in the connecting domain 18 can be easily detected with this variation. That is, the spectrum measuring section 15 can distinguish between BGS reflecting the gain generated in the connecting domain 18 set as 20° C. (a portion of the first optical fiber 11 belonging to the connecting domain 18), and BGS reflecting the gain generated in other domain with sufficient accuracy.

Further, in the case of such a spectrum measuring section 15 receives the probe light having acquired the gain by the Brillouin scattering generated in each position of the measurement target portions along the object to be measured M in the first optical fiber 11, the spectrum measuring section 15 outputs a second measurement value exhibiting the center frequency of the measured BGS to the temperature calculating section 16.

The temperature calculating section 16 calculates the temperature of the object to be measured M based on the second measurement value outputted from the spectrum measuring section 15. The temperature calculating section 16 has stored, in advance, a database in which the center frequency (data relevant to the shape of BGS) of BGS reflecting the gain generated in first optical fiber 11 is matched with the temperature of the first optical fiber 11 at the time of the gain having arisen.

The temperature calculating section 16 calculates the temperature of the object to be measured M based on the stored database and the second measurement value outputted from the spectrum measuring section 15. The temperature calculating section 16 can also calculate a temperature distribution of the object to be measured M by incorporating the second measurement value which exhibits the center frequency of BGS reflecting the gain generated in each position of the first optical fiber 11 in contact with measuring object M and calculating the temperature of the object to be measured M with respect to each second measurement value.

The correcting section 17 has the data (known data) relevant to the shape of BGS at the specified temperature in the connecting domain 18 set up as a reference value, and gives to the light source system 14 the correction instruction of the optical frequency of the pumping light or the probe light such that the reference value may be in agreement with the first measurement value which are a measurement data relevant to the shape of BGS of the connecting domain 18. The reference value is the value indicating the data relevant to the shape of the reference BGS reflecting the gain generated in a part of the first optical fiber 11 belonging to the connecting domain 18. The data relevant to the shape of the reference BGS are, in the data base which the temperature calculating section 16 stores, the same as the value of the data relevant to the shape of BGS associated with the temperature of 20° C. of the first optical fiber 11.

That is, the reference BGS means, among the spectra which the center frequency stored in the temperature calculating section 16 indicates, the spectrum acquired when the indication value of the optical frequency difference outputted by the optical frequency difference indicating section 13 is equivalent to the actual frequency difference of the probe light and the pumping light actually outputted from the light source system 14. In this embodiment, the center frequency of BGS generated in the first optical fiber 11 set as 20° C. is 10.80 GHz, and this center frequency is stored in the correcting section 17 as the reference value.

Then, the operation of the optical fiber temperature sensor 1 will be described. First, the indication value for making the optical frequency difference between the probe light and the pumping light sweep in the range of 10.00 GHz to 11.00 GHz is outputted to the light source 14 from the optical frequency difference indicting section 13. The light source system 14, while sweeping the optical frequency difference in the range of 10.00 GHz to 11.00 GHz, outputs the probe light and the pumping light of which each center frequency has been set by the optical frequency difference adjusting section 21 such that the Brillouin scattered light may be generated in the first optical fiber 11 belonging to the connecting domain 18.

The probe light and the pumping light outputted from the light source system 14 are made to be inputted opposing each other into the first optical fiber 11 and the second optical fiber 12, respectively. The probe light having acquired the gain with the Brillouin scattering generated in the first optical fiber 11 belonging to the connecting domain 18 corresponding to the propagation of the inputted probe light and the pumping light is received by the spectrum measuring section 15. Thereby, the data relevant to the shape of BGS are measured by the spectrum measuring section 15.

The center frequency (the first measurement value with respect to BGS in the connecting domain 18) of the measured BGS is outputted to the correcting section 17. In the case of that the first measurement value differs from the reference value, the correcting section 17 corrects the indication value outputted from the optical frequency difference indicating section 13 such that the first measurement value and the reference value may be mutually in agreement. And the indication value to which the correction has been applied is inputted into the light source system 14. The light source system 14, while actually sweeping the optical frequency difference in the range of 10.00 GHz to 11.00 GHz, outputs the probe light and the pumping light of which each center frequency has been set such that the gain may be generated in the portion where the first optical fiber 11 contacts the object to be measured M.

The probe light and the pumping light outputted from the light source system 14 are inputted into the first optical fiber 11 and the second optical fiber 12, respectively. The inputted probe light and the pumping light propagate, and thereby the probe light having acquired the gain with the Brillouin scattering generated in the domain of the first optical fiber 11 which contacts the object to be measured M is received by the spectrum measuring section 15. Thereby, the data relevant to the shape of BGS are measured by the spectrum measuring section 15.

The center frequency (the second measurement value with respect to BGS in the measurement target domain of the first optical fiber 11) of the measured BGS is outputted to the temperature calculating section 16. The temperature calculating section 16 computes the temperature of the object to be measured M based on the second measurement value and the database. By using the gain generated in each position in the domain where the first optical fiber 11 contacts the object to be measured M, that is, by acquiring the second measurement value, the temperature distribution of the object to be measured M can be measured. The temperature distribution means the distribution of the temperature measurement data of two or more points in the longitudinal direction.

For example, in the case of that the first measurement value corresponding to the first optical fiber 11 is 10.81 GHz and the reference value is 10.80 GHz, when the deviation between the first measurement value and the reference value is converted into temperature, it becomes about 10° C. The deviation between the first measurement value and the reference value such as this, originates in that the injection current outputted from the waveform generator corresponding to the indication value and the optical frequency response characteristic of DFB-LD corresponding to the injection current change over time.

Due to the change over time of the characteristic of these instruments, the actual value of the optical frequency difference between the pumping light and the probe light will change against the indication value. When the actual value of the optical frequency difference between the pumping light and the probe light will deviate from the indication value, BGS will deviate against the horizontal axis (indication value of optical frequency difference). Thereby, an error is generated in the temperature measurement using the data relevant to the shape of BGS.

Then, in the first embodiment, in the case of that the first measurement value obtained by the spectrum measuring section 15 differs from the reference value stored in the correcting section 17 mutually, the correction is applied to the indication value of the optical frequency difference such that both may be in agreement by the correcting section 17. Therefore, in the case of that the actual value against the indication value of the optical frequency difference changes, the deviation of the actual value will be corrected. More specifically, in the case of that the first measurement value changes from 10.80 GHz to 10.81 GHz, by applying the correction to the indication value by the correcting section 17, the first measurement value returns to 10.80 GHz.

In the state where the correction has been applied in this way, the data relevant to the shape of BGS of the measurement target domain of the first optical fiber along the object to be measured M are measured by the spectrum measuring section 15. Therefore, the temperature of the object to be measured for which the temperature calculating section 16 calculates based on the measured BGS is the data in which the correction has been reflected, and the error of temperature measurement is reduced effectively.

Besides, in the above-mentioned first embodiment, the optical frequency difference indicating section 13, the light source 14, the spectrum measuring section 15, the temperature calculating section 16, the correcting section 17, the box 19 including the connecting domain 18, and the optical frequency difference adjusting section 21 are preferred to be accommodated in housing. And in order not to have the effect of a distortion on the gain generated in connecting domain 18, this connecting domain 18 is preferred to be disposed in the housing so that the distortion may not be added.

In the above-mentioned first embodiment, optical frequency difference indicating section 13 instructed the optical frequency difference. However, the adjustment of the optical frequency of either the pumping light or the probe light (the other is fixed) is also equivalent. In this case, since it is equivalent to instruct the optical frequency difference, the instruction of the optical frequency difference is unnecessary. The optical frequency of the source may be adjusted directly by the instructions from correcting section 17 in stead of the instructions from the optical frequency difference indicating section 13.

Second Embodiment

Figure 3:
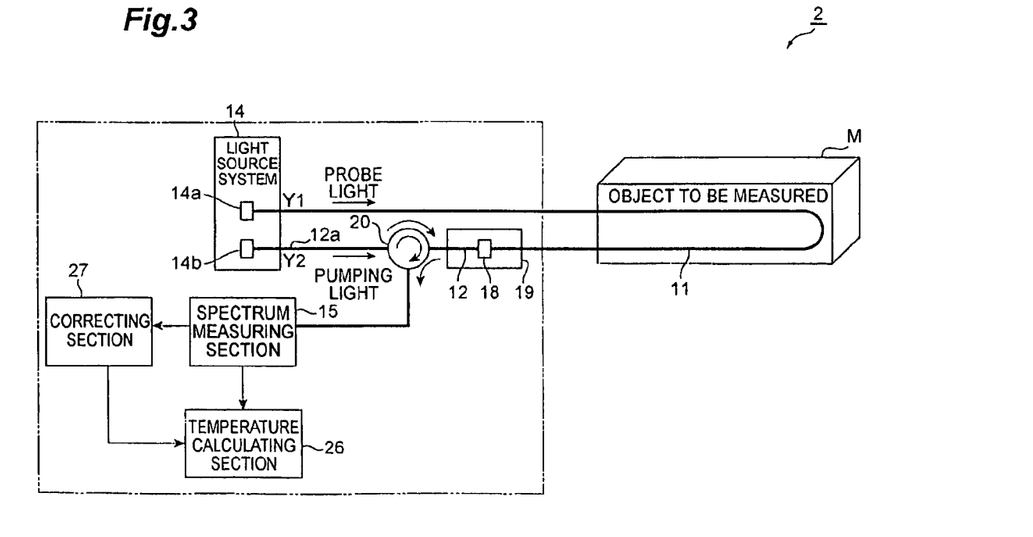
FIG. 3 shows a configuration of a second embodiment of the optical fiber temperature sensor according to the present invention.

In the above-mentioned first embodiment, the correcting section 17 instructs correction to the indication value of the optical frequency difference between the probe light and the pumping light such that the first measurement value and the reference value may be in agreement. On the other hand, in a second embodiment, a required temperature correction is performed based on the difference between the first measurement value and the reference value. FIG. 3 shows a configuration of the second embodiment of the optical fiber temperature sensor according to the present invention.

The optical fiber temperature sensor 2 according to the second embodiment comprises a temperature calculating section 26 and a correcting section 27, instead of the temperature calculating section 16 and the correcting section 17 of the optical fiber temperature sensor 1 according to the first embodiment. On the contrary, the optical fiber temperature sensor 2 according to the second embodiment is not provided with sections corresponding to the optical frequency difference indicating section 13 and the optical frequency difference adjusting section 21 of optical fiber temperature sensor 1 according to the first embodiment. Besides, other components of the optical fiber temperature sensor 2 are the same as those of the optical fiber temperature sensor 1.

In the correcting section 27, the data (known data) relevant to the shape of BGS in the connecting domain 18 at a specified temperature are set up as a reference data. In the correcting section 27, an amount of the temperature correction corresponding to the difference between the reference data and a measurement data relevant to the shape of BGS in connecting domain 18 is set up as a reduced value. The correcting section 27 outputs the reduced value based on the difference between the reference data and the actually computed measurement data relevant to the shape of BGS in connecting domain 18. Setting of the reduced value may be performed by a table or a conversion equation.

Then, based on the data (data measured by the spectrum measuring section 15) relevant to the shape of BGS reflecting the gain generated in the measurement target domain of the first optical fiber 11 disposed with contacting the object to be measured M, the temperature calculating section 26 calculates a temperature distribution of the measurement target domain of the first optical fiber 11 to correct with the reduced value computed by the correcting section 27.

Thus, in the second embodiment, the probe light and the pumping light are outputted from the light source system 14, and inputted opposing each other into the optical fiber. The data relevant to the shape of BGS reflecting the gain generated in a part of the optical fiber (portion belonging to the connecting domain 18 set as specified temperature) is measured by the spectrum measuring section 15. The reduced value of the amount of the temperature correction corresponding to the difference between the measurement data and the reference data is outputted by the correcting section 27. On the other hand, also data relevant to the shape of BGS reflecting the gain generated in the measurement target domain (portion installed in the object to be measured M) of the first optical fiber 11 is measured by the spectrum measuring section 15, and the temperature distribution which the temperature calculating section 26 calculated based on this measurement data (temperature distribution of the measurement target domain of the first optical fiber 11) is corrected using the reduced value outputted from the correcting section 27. Therefore, an error of temperature measurement can be reduced also with the optical fiber temperature sensor 2 according to this second embodiment. Besides, since this correction operation is performed by a soft ware, the simple and appropriate correction will become possible.

More specifically, in the case of that the reference data of the connecting domain 18 in 20° C. is 10.80 GHz and the measured data is 10.81 GHz, there is 0.01 GHz of frequency deviation between the measured data and the reference data. Since this is considered to be the deviation resulting from the light source, it can be similarly considered that 0.01 GHz of deviation is generated in the measurement target domain of the first optical fiber 11. Since the relation between the amount of the frequency shift of the measurement target domain of the first optical fiber 11 and the temperature are known, by correcting the calculation temperature by only the amount corresponding to the frequency of 0.01 GHz, the error of the temperature measurement can be reduced.

Third Embodiment

Figure 4:
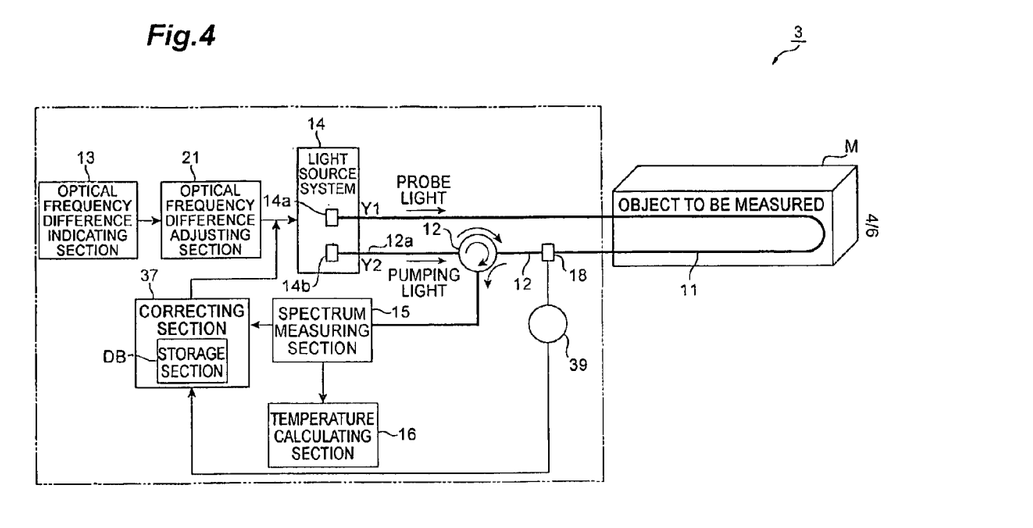
FIG. 4 shows a configuration of a third embodiment of the optical fiber temperature sensor according to the present invention.

In above-mentioned first and second embodiments, the connecting domain 18 is set as the specified constant temperature. On the other hand, in a third embodiment, the reference data (data relevant to the shape of BGS) exhibiting the center frequency of BGS reflecting the gain generated at various temperatures in the connecting domain 18 are stored in advance. As for the measurement data (the first measurement value) relevant to the shape of BGS in the connecting domain 18, by measuring the temperature of the connecting domain 18 at the time of BGS measurement, the indication value for the optical frequency difference is corrected such that the reference data and the first measurement value for the measured temperature may be made to be in agreement. FIG. 4 shows a configuration of the third embodiment of the optical fiber temperature sensor according to the present invention.

The optical fiber temperature sensor 3 according to the third embodiment comprises a thermometer (temperature measuring means) 39 in stead of the box 19 of the optical fiber temperature sensor 1 and at the same time, comprises a correcting section 37 and storage DB in stead of the correcting section 17. The thermometers 39 may be any device which can measure temperature, such as thermocouple and a device which measures temperature based on a resistance of a semiconductor. Other components of the optical fiber temperature sensor 3 are the same as those of the optical fiber temperature sensors 1 and 2.

The thermometer 39 measures a temperature of the connecting domain 18, and outputs the measurement result to the storage section DB. The storage section DB has stored the data relevant to the shape of BGS of the connecting domain 18 at various temperatures in advance as known reference values.

The correcting section 37 instructs correction of the optical frequency of the pumping light or the probe light such that a measurement data relevant to the shape of BGS of the connecting domain 18 and the reference data in the temperature actually measured by the thermometer 39 may be in agreement.

Thus, in the third embodiment, the reference data relevant to the shape of BGS of the connecting domain 18 at various temperatures are stored in the storage section DB, and the temperature of the connecting domain 18 is measured by the thermometer 39. Therefore, the reference data corresponding to the temperature of the connecting domain 18 when the first measurement value is obtained by the spectrum measuring section 15 can be obtained. And, in the case of that the first measurement value differs from the reference data, the correcting section 37 has applied a correction to the indication value such that both may be in agreement. Therefore, in the case of that the actual value against the indication value of the optical frequency difference changes, the deviation in the actual value will be corrected. Thus, in the state where the correction is applied to the indication value of the optical frequency difference, the spectrum measuring section 15 measures the data relevant to the shape of BGS reflecting the gain generated in the measurement target domain of the first optical fiber 11. Since the temperature calculating section 16 calculates the temperature of the object to be measured based on the center frequency of measured BGS, the measurement error of BGSweep be reduced. As the result, the error of the temperature measurement based on BGS is effectively reduced also by the third embodiment.

Figure 5:
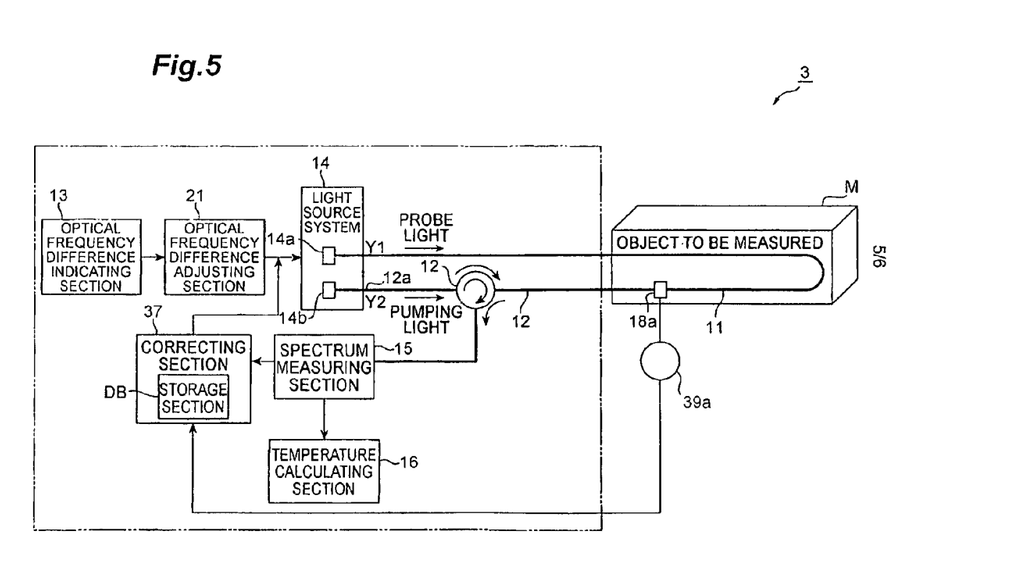
FIG. 5 shows a configuration of a modification of the optical fiber temperature sensor according to the third embodiment.

In the third embodiment, the temperature of the connecting domain 18 is measured by the thermometer 39. However, the portion where the temperature is measured may be a portion of the first optical fibers 11 installed in the object to be measured M. For example, as shown in FIG. 5, a portion 18a of the first optical fiber 11 contacting the object to be measured M may be measured by the thermometer 39a. In this case, the storage section DB stores in advance the data relevant to the shape of BGS reflecting the gain generated in the portion 18a at various temperatures as reference data (known data). FIG. 5 shows a configuration of a modification of the optical fiber temperature sensor according to the third embodiment.

Fourth Embodiment

Figure 6:
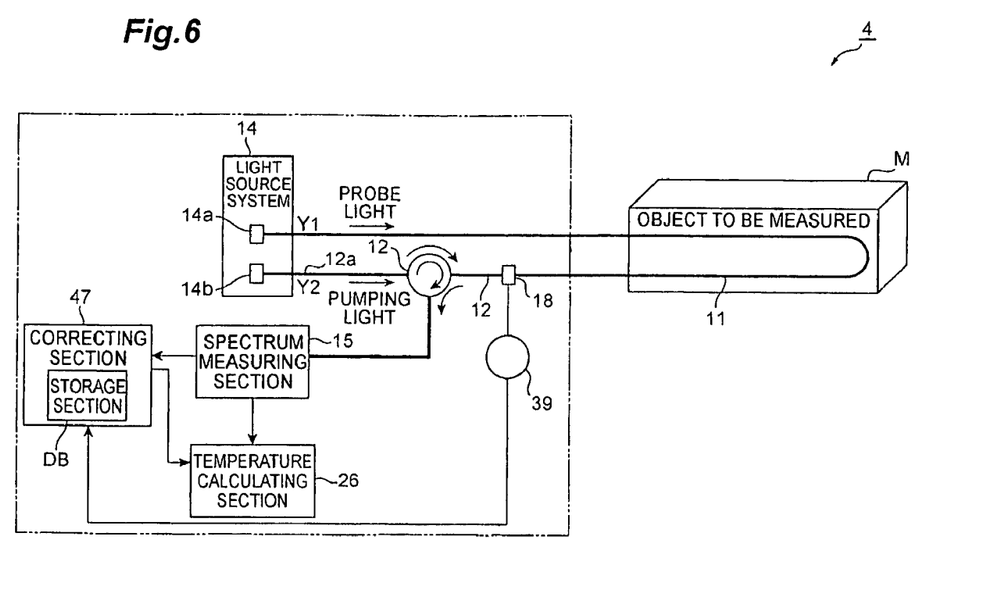
FIG. 6 shows a configuration of a fourth embodiment of the optical fiber temperature sensor according to the present invention.

In the third above mentioned embodiment, the correcting section 37 applies a correction to the indication value of the optical frequency difference between the probe light and the pumping light such that the first measurement value (measurement data relevant to the shape of BGS in the connecting domain 18) and reference data may be in agreement. On the other hand, in the fourth embodiment, the temperature to be calculated is corrected based on the difference between the first measurement value and the reference data. FIG. 6 shows a configuration of a fourth embodiment of the optical fiber temperature sensor according to the present invention.

The optical fiber temperature sensor 4 according to the fourth embodiment comprises a temperature calculating section 26 and a correcting section 47 in stead of the temperature calculating section 16 and the correcting section 37 of the optical fiber temperature sensor 3. On the contrary, the optical fiber temperature sensor 4 according to the fourth embodiment is not provided with sections corresponding to the optical frequency difference indicating section 13 and the optical frequency difference adjusting section 21 of the optical fiber temperature sensor 3. Other components of the optical fiber temperature sensor 4 are the same as those of the optical fiber temperature sensor 3.

In the correcting section 47, an amount of the temperature correction corresponding to the difference between the above mentioned reference data and a measurement data relevant to the shape of BGS of the connecting domain 18 is set up as a reduced value. Therefore, the correcting section 47 outputs the reduced value based on the difference between the reference data and the measurement data relevant to the shape of the actually calculated BGS generated in the connecting domain 18.

Then, based on the data (the data relevant to the shape of BGS measured by the spectrum measuring section 15) relevant to the shape of BGS reflecting the gain generated in the first optical fiber 11, the temperature calculating section 26 calculates a temperature distribution of the measurement target domain of the first optical fiber 11 disposed in the state contacting the object to be measured M, and further corrects the temperature distribution with this reduced value computed by the correcting section 47.

Thus, in the fourth embodiment, the probe light and the pumping light are outputted from the light source 14, and are inputted opposing each other into the optical fiber. The spectrum measuring section 15 measures the data relevant to the shape of BGS reflecting the gain generated in the connecting domain 18 in which the temperature measurement is possible. And, the reduced value of the amount of the temperature correction corresponding to the difference between the measurement data of the spectrum measuring section 15 and the reference data, among the stored reference data, corresponding to the temperature of the connecting domain 18 is outputted from the correcting section 47. On the other hand, the data relevant to the shape of BGS reflecting the gain generated in the measurement target domain of the first optical fiber 11 are also measured by the spectrum measuring section 15. Based on this measurement data, the temperature calculating section 26 calculates the temperature distribution of the measurement target domain of the first optical fiber 11, and further, the temperature distribution is corrected using the reduced value outputted by the correcting section 47. Therefore, an error of temperature measurement is effectively reduced also by this fourth embodiment. Since the temperature correction in this embodiment is also realized by the soft ware, the simple and appropriate correction will become possible.

In above mentioned the first to fourth embodiments, the connecting domain 18 is provided in advance in order to acquire correction information, but as long as BGSweep be specified which reflects the gain generated in the domain (or portion) which is set as specified temperature and the domain (or portion) in which temperature measurement is possible, there may not be the connecting domain 18. That is, only one optical fiber may be applied in stead of the first and the second optical fiber.

Besides, two or more connecting domains 18 may be provided in the optical fiber. The preset temperature of the connecting domain 18 may differ mutually, respectively.

In above mentioned the first to fourth embodiments, two light sources are used. However, one light source may be sufficient. In that case, on time base, the period made to be the pumping light period and the period made to be the probe light period are made to be set up respectively, and optical frequency is made to be controlled for every period.

In above mentioned the first to forth embodiments, the connecting domain 18 functions as a reference point for grasping positional relationship when measuring the temperature distribution. In each above mentioned embodiment, the data relevant to the shape of BGS reflecting the gain generated in the vicinity of the connecting domain 18 set as a specified temperature are made to be as a reference data. However, like the modification of the third embodiment shown in FIG. 5, the data relevant to the shape of BGS reflecting the gain generated in the portion distant from the connecting domain 18 may be set as the reference data. The data relevant to the shape of BGS reflecting the gain generated in the second optical fiber 12 may be set as the reference data.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The optical fiber temperature sensor according to the present invention is applicable to a thermometry/detection system using the gain change in accordance with the Brillouin scattering generated within the optical fiber installed under specified environments.

The invention claimed is:

1. An optical fiber temperature sensor, comprising:
an optical fiber including a first domain installed in an object, and a second domain set as a specified temperature;
an optical frequency difference adjusting section for sweeping a difference between each center frequency of probe light and pumping light to be inputted into the optical fiber;
a light source system for outputting the probe light into one end of the optical fiber, while outputting the pumping light into the other end of the optical fiber, each center frequency of the probe light and the pumping light being set by an indication of the optical frequency difference adjusting section;
a spectrum measuring section for receiving, as an outputted light from the optical fiber, the probe light having acquired a gain by Brillouin scattering generated with propagation of the probe light and the pumping light from the light source system, and for measuring data relevant to a shape of a Brillouin gain spectrum, the Brillouin gain spectrum being the spectrum of the gain acquired by the received probe light by the Brillouin scattering;
a temperature calculating section for computing a temperature distribution of the first domain in the optical fiber based on a measurement data relevant to the shape of the Brillouin gain spectrum of the first domain measured by the spectrum measuring section; and
a correcting section for instructing correction of at least one of optical frequencies of the pumping light and the probe light outputted to the optical fiber to the light source system so as to make known reference data relevant to the shape of the Brillouin gain spectrum set up in advance as the reference value of the Brillouin gain spectrum of the second domain at the specified temperature be in agreement with the measurement data relevant to the shape of the Brillouin gain spectrum of the second domain.

2. An optical fiber temperature sensor, comprising:
an optical fiber including a first domain installed in an object, and a second domain set as a specified temperature;
a light source system for outputting probe light to one end of the optical fiber, while outputting pumping light to the other end of the optical fiber;
a spectrum measuring section for receiving, as an outputted light from the optical fiber, the probe light having acquired a gain by Brillouin scattering generated with propagation of the probe light and the pumping light from the light source system, and for measuring data relevant to a shape of a Brillouin gain spectrum, the Brillouin gain spectrum being the spectrum of the gain acquired by the received probe light by the Brillouin scattering;
a correcting section for outputting an optimum value as a correction value among values set up in advance as a reduced value of an amount of a temperature correction corresponding to a difference between a reference data and a measurement data, based on the difference between known reference data relevant to the shape of the Brillouin gain spectrum set up in advance as the reference value of the Brillouin gain spectrum of the second domain at the specified temperature and a measurement data relevant to the shape of the Brillouin gain spectrum of the second domain; and
a temperature calculating section for computing a corrected temperature distribution in the first domain in the optical fiber based on the measurement data relevant to the shape of the Brillouin gain spectrum of the first domain measured by the spectrum measuring section and the correction value outputted from the correcting section.

3. An optical fiber temperature sensor, comprising:
an optical fiber including a first domain installed in an object, and a second domain to be temperature-measured by a specified temperature measuring means;

an optical frequency difference adjusting section for sweeping a difference between each center frequency of probe light and pumping light to be inputted into the optical fiber;

a light source system for outputting the probe light into one end of the optical fiber, while outputting the pumping light into the other end of the optical fiber, each center frequency of the probe light and the pumping light being set by a instruction of the optical frequency difference adjusting section;

a spectrum measuring section for receiving, as an outputted light from the optical fiber, the probe light having acquired a gain by Brillouin scattering generated with propagation of the probe light and the pumping light from the light source system, and for measuring data relevant to a shape of the Brillouin gain spectrum, the Brillouin gain spectrum being the spectrum of the gain acquired by the received probe light by the Brillouin scattering;

a temperature calculating section for computing a temperature distribution of the first domain in the optical fiber based on a measurement data relevant to the shape of the Brillouin gain spectrum of the first domain measured by the spectrum measuring section;

a storage section for storing known reference data relevant to the shape of the Brillouin gain spectrum set up in advance as reference values of the Brillouin gain spectrum of the second domain with respect to various temperatures; and a correcting section for instructing correction of at least one of optical frequencies of the pumping light and the probe light outputted to the optical fiber to the light source system so as to make the measurement data relevant to the shape of the Brillouin gain spectrum of the second domain be in agreement with the reference data corresponding to the temperature of the second domain measured by the temperature measuring means among the reference data stored in the storage part.

4. An optical fiber temperature sensor, comprising:

an optical fiber including a first domain installed in an object, and a second domain to be temperature-measured by a specified temperature measuring means;

a light source system for outputting probe light to one end of the optical fiber, while outputting pumping light to the other end of the optical fiber;

a spectrum measuring section for receiving, as an outputted light from the optical fiber, the probe light having acquired a gain by Brillouin scattering generated with propagation of the probe light and the pumping light from the light source system, and for measuring data relevant to a shape of the Brillouin gain spectrum, the Brillouin gain spectrum being the spectrum of the gain acquired by the received probe light by the Brillouin scattering;

a storage section for storing known reference data relevant to the shape of the Brillouin gain spectrum set up in advance as reference values of the Brillouin gain spectrum of the second domain with respect to various temperatures;

a correcting section for outputting an optimum value as a correction value among values set up in advance as a reduced value of an amount of a temperature correction corresponding to a difference of a reference data and a measurement data based on the difference between the reference data corresponding to the temperature of the second domain measured by the specified temperature measuring means among the reference data stored in the storage part and a measurement data relevant to the shape of the Brillouin gain spectrum of the second domain; and a temperature calculating section for computing a corrected temperature distribution in the first domain in the optical fiber based on the measurement data relevant to the shape of the Brillouin gain spectrum of the first domain measured by the spectrum measuring section and the correction value outputted from the correcting section.

* * * * *